Nov. 27, 1928.
F. K. VREELAND
1,692,877
AUDIOFREQUENCY INTERFERENCE PREVENTER
Filed July 12, 1921
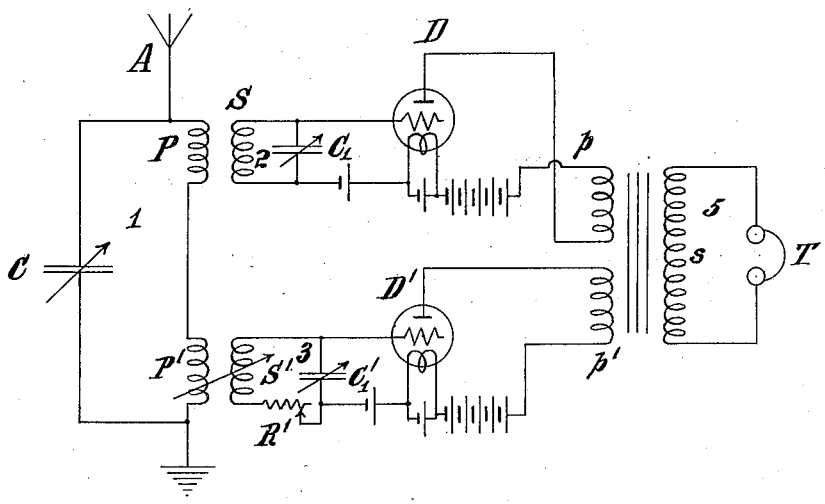
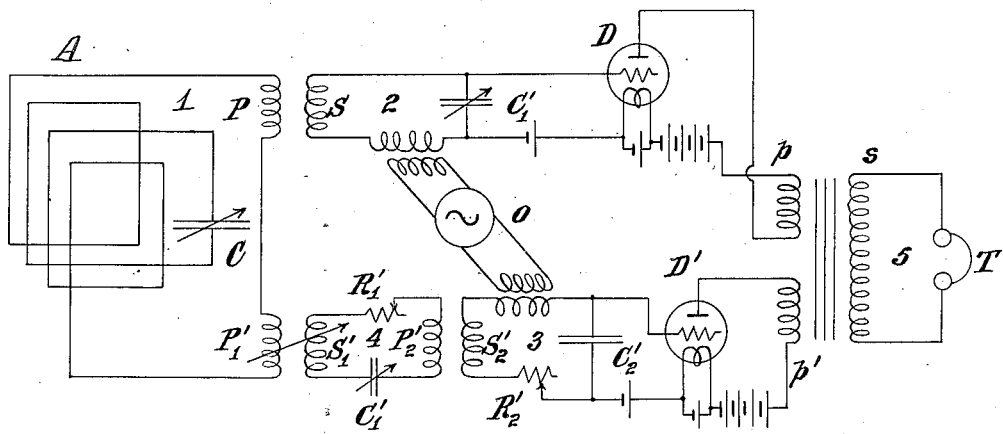
Inventor
Frederick K. Vreeland,
By his Attorney
Frank L. Dyer Patented Nov. 27, 1928.

1,692,877

UNITED STATES PATENT OFFICE.

FREDERICK K. VREELAND, OF MONTCLAIR, NEW JERSEY.

AUDIOFREQUENCY INTERFERENCE PREVENTER.

Application filed July 12, 1921. Serial No. 484,060.

The invention herein described relates to an improvement in receivers for radiant energy whereby signal impulses are effectively and clearly received and interference is simultaneously eliminated.

In my application for United States patent, Serial No. 399,534, and in application filed on even date herewith entitled "Prevention of interference in radio reception", Serial No. 484,059, I have described receiving systems whereby the effect of interfering impulses acting on the system is balanced and annulled by the equal and opposite effect of a balancing current derived from the waves which produce the interference. The apparatus employed includes a signal receiving circuit preferentially responsive to signal impulses, with associated collecting means, a balancing circuit preferentially responsive to impulses of interfering frequency, and means for deriving from the current in the balancing circuit an effect equal and opposite to the effect of the interfering impulses on the receiving system. In the arrangement specifically set forth in the aforenamed applications the balance was obtained by means of currents of radio frequency whose effects were equalized in magnitude, phase, frequency and, when desired, in decrement. In the present application I desire to set forth an arrangement for the balance of derived audio frequency currents which was mentioned, but not specifically set forth, in the second application aforesaid.

In my application, Serial No. 401,108, I decribed an arrangement for the elimination of strays whereby the strays were caused to produce a balancing current whose effect on the receiving system is equal and opposite to that of the interfering stray currents, employing to this end detectors or equivalent means of reducing the radio frequency currents to a lower or audio frequency and balancing the low frequency effects, thereby avoiding the necessity of radio frequency phasing and balancing.

The present invention embodies features of all these applications in new combinations, together with other improvements which result in greater simplicity and effectiveness.

In the drawing, Fig. 1 shows a simple but effective embodiment of the invention;

Fig. 2 shows a modification particularly adapted to beats reception of continuous waves.

In the drawing, Fig. 1, A is a signal collector, which is shown as an ordinary antenna, although a loop or ground wire or other collecting means may be employed with equal effect. The collecting circuit 1 includes also coupling means, such as the coupling coils P, P', whereby energy is taken off to the receiving and balancing systems respectively. These coupling coils may serve also for tuning the collector circuit, or separate tuning means such as the condenser C may be employed, or the collector circuit may be aperiodic, the particular type of circuit employed being immaterial to the present invention in its broad aspect. Where the chief object is the elimination of signal interference it is preferably a circuit preferentially responsive to the signal frequency so that interfering currents are of reduced intensity.

Associated with the collecting circuit 1 is a signal receiving circuit 2 comprising the usual inductance S and condenser $C_1$, across which is connected a detector D.

A balancing circuit 3 is also associated with the collecting circuit 1 through the coupling P', S', this coupling being preferably adjustable. The circuit 3 is tuned to a different frequency from the circuit 2, and in the case of signal interference it is tuned preferentially to the interfering frequency. This circuit 3 includes the inductance S' and the capacity $C_1'$, and it may include also a resistance R' for adjusting the decrement. It is associated with a second detector D'.

The output circuits of detectors D and D' feed into an audio frequency or receiving circuit 5 including a secondary coil $s$ coupled to primary coils $p$, $p'$. In circuit with the coil $s$ is a telephone or other translating device T.

The operation of the apparatus is as follows:

When the interfering impulse is a signal wave of different frequency from the desired signal wave, the circuit 3 is preferably tuned to the interfering frequency. In general it is made preferentially responsive to this frequency, so that currents of this frequency induced therein are relatively larger, and signal currents induced therein are relatively smaller, than the currents of corresponding frequencies in the signal circuit 2. When the interfering waves are damped or aperiodic the damping of the circuit 3 is adjusted so that the envelope of the current wave in this circuit is the same as that of the interfering current in the circuit 2. When the balancing current is rectified by the detector D' the wave form of the derived current will therefore be the same as the wave form of the derived interfering current passing through the detector D. The magnitudes of these currents are made equal in any convenient way as, for example by adjusting the coupling P, S, or the coupling P', S', or by adjusting the sensitivity of detectors D and D', the purpose being to equalize the effects of the interfering and balancing currents in magnitude and in wave form.

When undamped waves are being received by the beats method it is necessary also to synchronize the beat currents. This is best accomplished by exciting both receiving and balancing detectors by the same local source O, as shown in Fig. 2. Due attention should be given to the phasing of the balancing currents, as fully explained in my former application herein mentioned. This is accomplished by means of a quadrating circuit 4, which produces a phase shift corresponding to that produced in circuit 2 by detuning at the interfering frequency, or by other phasing means.

Where a number of interfering waves of different frequencies are to be eliminated simultaneously the system including the circuit 3 and the detector D' and their appurtenances is duplicated or multiplied to any desired extent.

This system is effective, not only for the elimination of signal interference, but it is also largely effective for eliminating atmospheric strays. In this case the collecting circuit 1 should be made of such a character that currents induced therein by strays produce similar effects on the circuits 2 and 3. This can be done by making its natural frequency slightly different from the signal frequency and tuning the circuit 3 to a frequency differing from that of the collector by a similar amount. Strays will then set up similar oscillations of different frequencies in the circuits 2 and 3. These circuits being adjusted to equal decrements the rectified currents delivered by the detectors D and D' will be of the same form, and when balanced in magnitude by the means already described they will annul each other.

The arrangement in which an aperiodic collector is used is not claimed herein, as it is made the subject of a separate application filed on even date herewith, Serial No. 484,061.

Having now described my invention, what I claim as new therein and desire to secure by Letters Patent is as follows:

1. In a receiving system for radiant energy, a collecting circuit, two or more tuned circuits associated therewith, one of which is preferentially responsive to signal impulses and the other tuned to a definite interfering signal frequency, integrating means associated with each circuit, means for applying the integrated currents differentially to a receiver, means whereby the interfering effects neutralize each other, and means for observing the unbalanced signal effect.

2. In a receiving system for radiant energy, a collecting circuit responsive to a single signal frequency, two or more tuned circuits associated therewith, one of which is preferentially responsive to the signal impulses and the other tuned to a definite interfering signal frequency, integrating means associated with each circuit, means for applying the integrated currents differentially to a receiver, means whereby the interfering effects neutralize each other, and means for observing the unbalanced signal effect.

3. In a receiving system for radiant energy, a collecting circuit responsive to a single signal frequency and less responsive to an interfering signal frequency, a circuit associated therewith tuned to the signal frequency, a second tuned circuit also associated therewith and preferentially responsive to a definite interfering signal frequency, integrating means associated respectively with the two tuned circuits, means for applying the integrated currents in opposite senses to a receiver, means whereby the effect on the receiver of the current of interfering frequency in the first circuit is made equal to the opposite effect on the receiver of the current of interfering frequency in the second circuit, and means for observing the unbalanced signal effect.

4. In a receiving system for radiant energy, two or more tuned circuits, one of which is preferentially responsive to signal impulses and the other tuned to a definite interfering signal frequency, a collecting circuit associated with both of these circuits and tuned to an intermediate frequency, integrating means associated with each of the first two circuits, means for applying the integrated currents differentially to a receiver, means whereby the interfering effects neutralize each other, and means for observing the unbalanced signal effect.

5. A system of receiving radiant energy and simultaneously eliminating interference, wherein are combined collecting means, a circuit associated therewith preferentially responsive to signal frequency and less responsive to interfering frequency, a second circuit associated therewith and tuned to a definite and different interfering signal frequency and responsive in similar form to such interfering signal frequency, a detector associated with each circuit, a receiver differentially associated with both detectors, means for balancing the opposed interfering effects, and means for observing the unbalanced signal effect.

6. A system of receiving radiant energy and simultaneously eliminating interference, wherein are combined a tuned collector, a circuit associated therewith preferentially responsive to signal frequency and less responsive to interfering frequency, a second circuit associated therewith and tuned to a definite and different interfering signal frequency and responsive in similar form to such interfering signal frequency, a detector associated with each circuit, a receiver differentially associated with each detector, means for balancing the opposed interfering effects, and means for observing the unbalanced signal effect.

This specification signed this 5th day of July, 1921.

FREDERICK K. VREELAND.